(12) United States Patent
Webster (10) Patent No.: US 9,710,170 B2
(45) Date of Patent: Jul. 18, 2017

(54) PROCESSING DATA STORAGE COMMANDS FOR ENCLOSURE SERVICES

(71) Applicant: Western Digital Technologies, Inc., Irvine, CA (US)

(72) Inventor: Michael W. Webster, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/639,442

(22) Filed: Mar. 5, 2015

(65) Prior Publication Data

US 2016/0259567 A1    Sep. 8, 2016

(51) Int. Cl.
*G06F 12/00* (2006.01)
*G06F 3/06* (2006.01)

(52) U.S. Cl.
CPC .......... *G06F 3/0613* (2013.01); *G06F 3/0659* (2013.01); *G06F 3/0665* (2013.01); *G06F 3/0688* (2013.01); *G06F 3/0689* (2013.01)

(58) Field of Classification Search
CPC .... G06F 3/0613; G06F 3/0659; G06F 3/0665; G06F 3/0688; G06F 3/0689
USPC .......................................... 711/103, 202, 203
See application file for complete search history.

(56) References Cited

U.S. PATENT DOCUMENTS

| | | |
|---|---|---|
| 6,499,054 B1 | 12/2002 | Hesselink et al. |
| 6,732,158 B1 | 5/2004 | Hesselink et al. |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,590,770 B2 | 9/2009 | Mandrell et al. |
| 7,600,036 B2 | 10/2009 | Hesselink et al. |
| 7,788,404 B2 | 8/2010 | Hesselink et al. |
| 7,793,042 B2 * | 9/2010 | Reeves ................. G06F 1/3203 711/100 |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,041,872 B1 | 10/2011 | Castleberry |
| 8,255,661 B2 | 8/2012 | Karr et al. |
| 8,285,965 B2 | 10/2012 | Karr et al. |

(Continued)

FOREIGN PATENT DOCUMENTS

WO    2012109679 A2    8/2012

OTHER PUBLICATIONS

Peter M. Chen et al,, "A New Approach to I/O Performance Evaluation: Self-Scaling I/O Benchmarks, Predicted I/O Performance", ACM Transactions on Computer Systems (TOCS)—Special Issue on Computer Architecture, Nov. 1994.*

(Continued)

*Primary Examiner* — Pierre-Michel Bataille
(74) *Attorney, Agent, or Firm* — Chang & Hale LLP (57) ABSTRACT

Systems and method are disclosed for processing data storage commands for enclosure services. In one embodiment, a data storage device may include a virtual ATA packet interface (VATAPI). The VATAPI may identify itself as a SCSI enclosure services (SES) device. The VATAPI may allow the data storage device to use SES operations/commands to perform operations/commands for enclosure services.

20 Claims, 5 Drawing Sheets

(56) References Cited

U.S. PATENT DOCUMENTS

| | | | |
|---|---|---|---|
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,458,381 B2 | 6/2013 | Holty et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,683,172 B2* | 3/2014 | Hashimoto | G06F 9/5077 711/173 |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,943,237 B1 | 1/2015 | Lin | |
| 2004/0148460 A1* | 7/2004 | Steinmetz | G06F 3/0611 711/114 |
| 2005/0144195 A1 | 6/2005 | Hesselink et al. | |
| 2005/0144200 A1 | 6/2005 | Hesselink et al. | |
| 2006/0007576 A1* | 1/2006 | Georgis | G06F 3/0607 360/69 |
| 2008/0162811 A1* | 7/2008 | Steinmetz | G06F 13/4234 711/114 |
| 2011/0314468 A1* | 12/2011 | Zhou | G06F 9/45558 718/1 |
| 2012/0036041 A1 | 2/2012 | Hesselink | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2013/0326615 A1 | 12/2013 | Khanvilkar | |
| 2014/0095439 A1 | 4/2014 | Ram | |
| 2014/0169921 A1 | 6/2014 | Carey | |
| 2014/0173215 A1 | 6/2014 | Lin et al. | |
| 2014/0201562 A1* | 7/2014 | Breakstone | G06F 1/30 713/600 |

OTHER PUBLICATIONS

Rodney Van Meter, "VISA: Netstation's Virtual Internet SCSI Adapter", ASPLOS VIII Proceedings of the Eighth International Conference on Architectural Support for Programming Languages and Operating Systems, Oct. 1998.*

Weber, et al., "Information technology—ATA/ATAPI Command Set—3 (ACS-3)," American National Standards Institutute, Inc. (Working Draft Project, Revision 5), Oct. 28, 2013, pp. 1-577.

Masiewicz, "Information Technology—AT Attachment—8, ATA Serial Transport (ATA8-AST) ," American National Standard Institututes, Inc. (Working Draft, Revision 0c), Jun. 16, 2005, pp. 1-318.

McFerrin, "Information Technology—Multi-Media Commands—6 (MMC-6) ," American National Standard Institututes, Inc. (Working Draft, Revision 2g), Dec. 11, 2009, pp. 1-715.

International Search Report and Written Opinion for PCT/US2016/018944 dated Jul. 25, 2016.

* cited by examiner

PROCESSING DATA STORAGE COMMANDS FOR ENCLOSURE SERVICES

BACKGROUND

Distribution of data storage across one or more data storage devices can provide increased data security through data redundancy. One type of data storage device may be a direct-attached storage (DAS) device, DAS devices may provide one or more computing devices with direct access to data via a connection cable (e.g., via a direct or physical connection). Another type of data storage device may be a Network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to monitoring input voltages for data storage device.

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.). A DAS device may provide a convenient mechanism for transferring data between computing devices, increasing the storage capacity (e.g., increase the storage space) of a computing device, and/or providing increased data security through data redundancy. Another example of a data storage device/system may be a NAS device. A NAS device may provide file-level data storage over a computer network, wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability for a data storage device to provide enclosure services (e.g., SES) and/or use SES operations/commands with a data storage device that uses ATAPI. The data storage device may provide the enclosure services without using an additional driver for the enclosure services and/or without using tunneling techniques. The data storage device may identify at least a portion of the data storage device as an SES device which may allow the data storage device to receive and/or process data storage commands such as SES commands, SCSI commands, RAID commands, and/or vendor commands.

While certain embodiments are disclosed herein in the context of a particular communication interface (e.g., a bus interface such as Thunderbolt or eSATA), the principles disclosed herein may be applicable to any suitable or desirable communication interface. Examples of communication interfaces may include, but are not limited to, SATA, USB, IEEE 1394 (FireWire), Serial Attached SCSI (SAS), PCIe, etc. Furthermore, the examples, embodiments, and/or implementations described herein may be applicable to any data storage device that uses ATA and/or ATAPI.

Data Storage Devices

Figure 1:
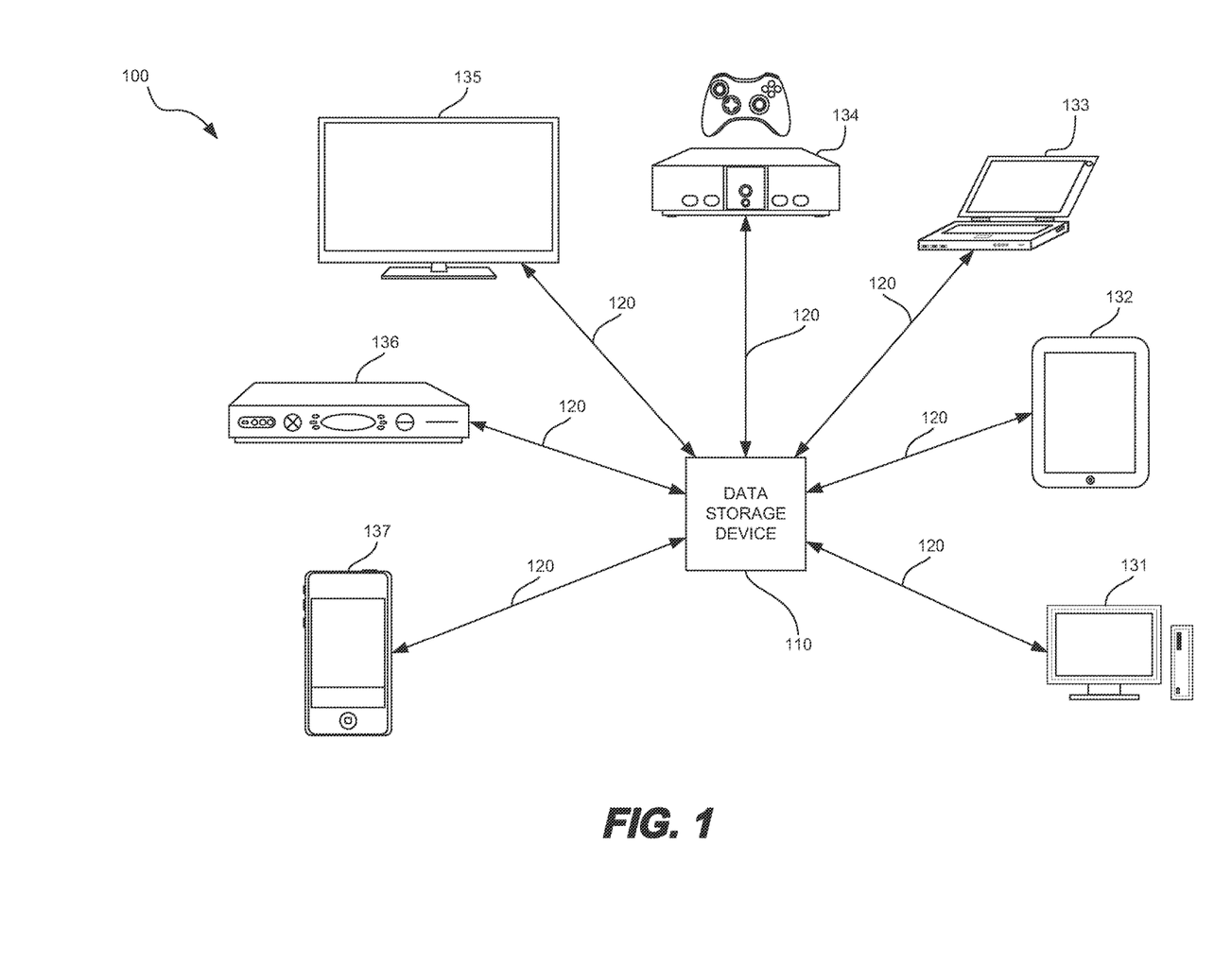
FIG. 1 is a diagram of a data storage system, according to an embodiment.

FIG. 1 is a diagram of a data storage system 100, according to an embodiment. In the data storage system 100 a data storage device 110 may be communicatively coupled to one or more client devices (e.g., computing devices) in order to provide file-based data storage services to the one or more client devices (e.g., one or more computing devices). Types of client devices (e.g., computing devices) that may have access to the data storage device 110 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices.

The data storage device 110 device may provide various client devices (e.g., phones 137, cable set-top boxes 136, smart TV's 135, video game consoles 134, laptop computers 133, tablet computers 132, desktop computers 131) with access to various types of user data stored on the data storage device 110. The data storage device 110 may also allow users to store various types of user data on the data storage device 110. The data storage device 110 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In one embodiment, the data storage device 110 may be a DAS device. The DAS device may be directly coupled to one or more of client devices 131-137 via connection cable 120. In another embodiment, the data storage device 110 may also be a NAS device. The NAS device may also be coupled to the client devices (e.g., computing devices) 131-137 via a network (not shown in FIG. 1). In one embodiment, network may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

With further reference to FIG. 1, the data storage device 110 (e.g., magnetic disk drive, hybrid hard drive, solid-state drive, etc.) may include a controller (not shown in FIG. 1) configured to receive data commands (e.g., data storage commands) and to execute such commands in one or more non-volatile memory components of the data storage device 110. Such commands may include data read/write commands, and the like. The controller may be configured to receive data commands from a communication interface residing on a computing device. Data commands (e.g., data storage commands) may specify a block address in the data storage device 110 and data may be accessed/transferred based on such commands.

The data storage device 110 may be configured to store data in one or more magnetic recording disks and/or the solid state memory devices/arrays. In an embodiment, the data storage device 110 may comprise a cable box, a backup disk drive; a media storage unit, a streaming media device, a digital camera, or any other electronic device which may store data that may need to be accessed directly or wirelessly.

In certain embodiments, the data storage device 110 may store data received from a client device such that the data storage device 110 acts as data storage for the client device. To facilitate this function, the data storage device 110 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 110. Mapping data indicating the mapping of logical addresses to physical memory addresses may be maintained in the data storage device 110.

As discussed above, the data storage device 110 may be a DAS device that is coupled to the one or more client devices via a connection cable 120 (e.g., a Thunderbolt cable, a SATA cable, etc.). The data storage device 110 may use the ATA Packet Interface (ATAPI) to perform read and write operations for data (e.g., blocks of data) stored on the data storage device 110. For example, ATAPI may use ATA commands (e.g., data storage commands) and/or operations to perform read and write operations to the data stored on the data storage devices. If the data storage device 110 identifies itself as a CD-ROM type device (e.g., responds with the value 0x05 when the data storage device 110 receives an INQUIRY command), the data storage device 110 may only be allowed to use the multimedia commands (MMC) provided by ATAPI. ATAPI may allow a SCSI command (e.g., a SCSI command descriptor block (CDB)) to be tunneled through the ATA command set. For example, ATAPI may allow a SCSI CDB to be included as the payload of an ATA frame information structure (FIS) packet.

In one embodiment, the data storage device 110 may also support other types of operations such as redundant array of inexpensive disk (RAID) operations, encryption/decryption operations, and other non-data related operations (e.g., power management operations, cooling/temperature control, password management, etc.). The data storage device may use enclosure services to perform the other types of operations (e.g., operations other than reading and/or writing data to a data storage device). The SCSI enclosure service (SES) may be an example of an enclosure service. Although the present disclosure may refer to SES, it shall be understood that in different embodiments other types of enclosure services may be used. SES may use additional commands (e.g., data storage commands) and/or operations to perform the other types of operations. For example, SES may use SCSI commands and/or RAID commands to change the RAID mode of the data storage device 110. In another example, SES may use vendor commands (e.g., e.g., commands/operations that are defined by and/or are specific to a vendor of the data storage device 110) to allow a user to controller the speed of a cooling fan that may be part of the data storage device 110. The multimedia commands may not include the additional commands and/or operations that may be used to perform the other types of operations (e.g., that may be used to implement/perform SES operations/commands and/or enclosure services).

Although data storage devices/drives/systems may provide various benefits, as described above, in certain configurations, such systems may be associated with various issues and/or drawbacks. For example, data storage devices may use the Thunderbolt and eSATA communication interfaces because Thunderbolt and eSATA communication interfaces may allow for faster data transfers (e.g., may have faster data transfer rates) than other communication interfaces (such as USB). Many data storage devices that use these communication interfaces (e.g., Thunderbolt, eSATA, etc.) also use the multimedia commands (MMC) of ATAPI perform read and/or operations on the data storage device. Data storage device that are CD-ROM type devices may not support the commands to perform/implement SES commands and/or enclosure services because the multimedia commands of ATAPI do not support the operations/commands. In addition, some operating systems may not allow the use of certain ATA commands (e.g., SMART READ LOG and SMART WRITE LOG commands) which may be used to implement/perform SES commands and/or enclosure services. Thus, the data storage devices may not be able to perform/implement SES commands and/or enclosure services when the data storage devices identify themselves as CD-ROM type devices (e.g., use ATAPI multimedia commands).

Data storage device vendors may implement (e.g., create or write) a device driver in order to access certain commands/operations restricted by an operating system (e.g., SMART READ LOG, SMART WRITE LOG, etc.). However, users may prefer not to install a driver in order to use a data storage device and the data storage device vendor may need to provide support for the driver (e.g., technical support for installing and/or using the driver). Data storage device vendors may also use tunneling techniques or methods to bypass the restrictions of the operating system. For example, a multi-byte command (e.g., a 12 byte command, a 16 byte command) may be delivered using the logical block address (LBA) field of other ATA commands that the operating system does not restrict. However, these tunneling techniques may be more prone to error and may not work depending on the operating system and/or drivers used in a client device. Thus, some types of operations (e.g., RAID operations, power management operations, encryption/decryption operations, other non-data related operations, etc.) may not be performed by a data storage device without the use of additional drivers and/or tunneling techniques.

It may be useful to provide a data storage device that allows the use of communication interfaces with faster data transfer rates (e.g., Thunderbolt, eSATA) and that supports SES (or other enclosure services) operations/commands. Certain embodiments disclosed herein provide the ability to provide enclosure services and/or use SES commands with a data storage device that uses ATAPI. In one embodiment, the data storage device 110 may include a virtual ATA packet interface (VATAPI). The VATAPI may identify itself as an SES device (rather than a CD-ROM type device). The VATAPI may allow the data storage device to use SES operations/commands to perform operations/commands in addition to reading/writing data to the data storage device.

Virtual ATA Packet Interface

Figure 2:
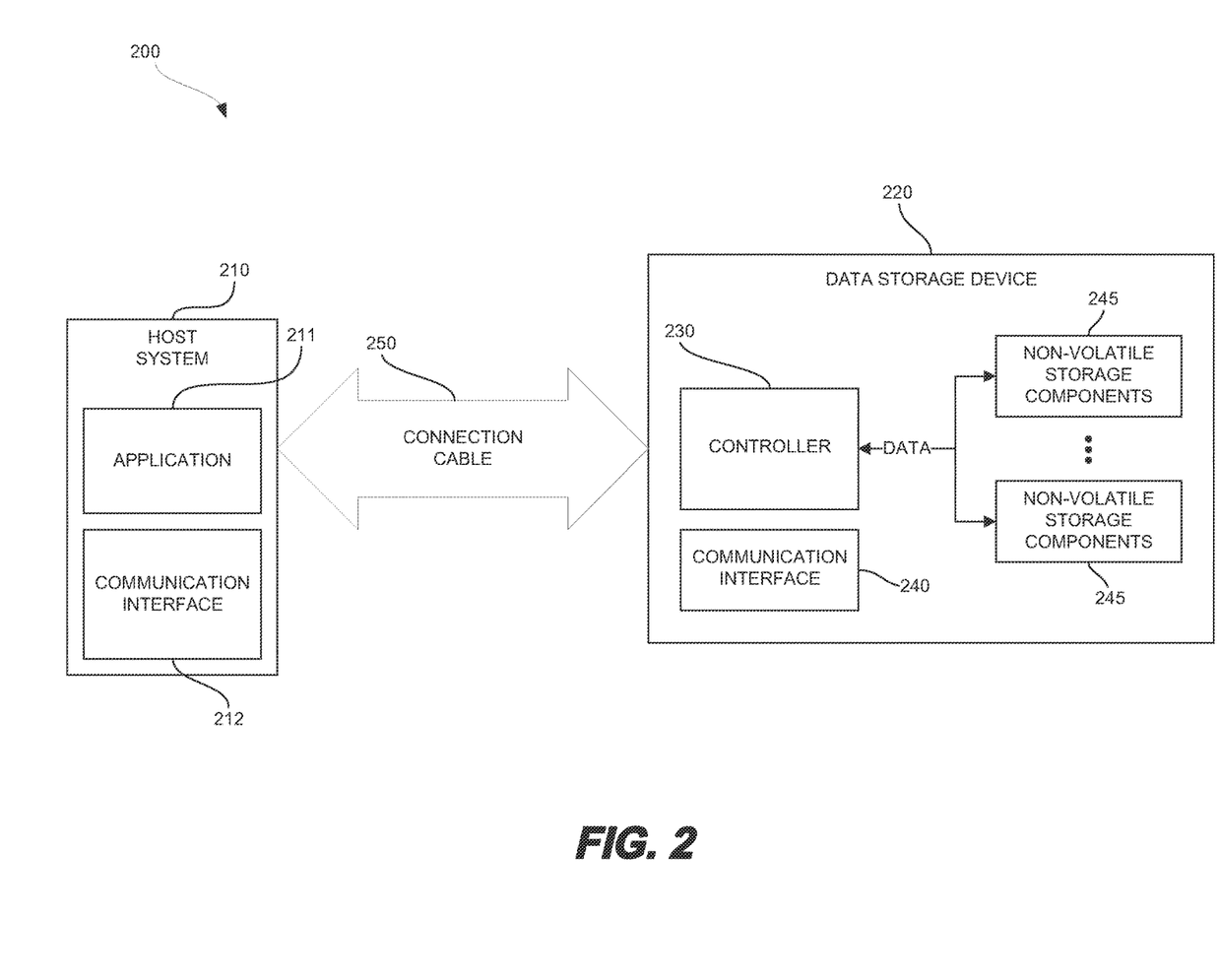
FIG. 2 is a diagram of a data storage system, according to an embodiment.

FIG. 2 is a diagram of a data storage system 200 according to an embodiment. The data storage system 200 includes a host system 210, a connection cable 250, and a data storage device 220. The host system 210 may be a computing device (e.g., a laptop computer, a desktop computer, a server computer, a tablet computer, a smart phone, a set-top box, a smart TV, a video game console, etc.). The data storage device 220 may include a controller 230, a communication interface 240, and non-volatile storage components 245. In one embodiment, the non-volatile storage components 245 may include non-volatile magnetic media, and/or solid-state memory, such as NAND flash. The controller 230 may provide overall control for the data storage device 220. In certain embodiments, the data storage device 220 may be a hard disk drive. The non-volatile storage components 245 may include one or more disks and the data storage device 220 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 220 may be, for example, a hybrid hard drive including both magnetic media and solid-state media.

The controller 230 may receive data and storage access commands (e.g., data storage commands) from a communication interface 212 of a host system 210. Storage access commands communicated by the communication interface 212 may include write and read commands issued by the host system 210. The storage access commands may specify an LBA, or range of LBAs, in the data storage device 220, and the controller 230 may execute the received storage access commands in the non-volatile storage components 245. In a hybrid hard drive, data may be stored in a magnetic media storage component as well as non-volatile solid-state memory.

The data storage device 220 may store data received from the host system 210, such that the data storage device 220 acts as memory for the host system 210. To facilitate this memory function, the controller 230 may implement a logical interface. The logical interface may present to the host system 210 the memory of the data storage device 220 as a set of logical addresses (e.g., contiguous address) where data can be stored. The controller 230 may map logical addresses to various physical memory addresses in the non-volatile storage components 245 and/or other memory module(s).

The data storage device 220 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the host system 210 as a single drive. Data may be distributed across the RAID memory modules/drives according to any desirable or practical RAID level, depending on the level of redundancy and/or performance desired. For example, the data storage device 220 may be configured to implement RAID 0, RAID 1, RAID 5, RAID 10, or other RAID technology, depending on data reliability, availability, performance and/or capacity considerations or requirements.

The host system 210 may be coupled to the data storage device 220 via connection cable 250. The connection cable 250 may directly connect the host system 210 and the data storage device 220. The connection cable 250 may use one or more communication interfaces (such as a bus interface) and/or protocols that may allow the host system 210 to communicate with the data storage device 220. In one embodiment, the communication interface 240 and the communication interface 212 may be Thunderbolt interfaces. In another embodiment the communication interface 240 and the communication interface 212 may be eSATA interfaces. In other embodiments, the communication interface 240 and the communication interface 212 may be any communication interface that uses ATAPI. Other examples of communication interfaces may include, but are not limited to, SATA, USB, IEEE 1394 (FireWire), Serial Attached SCSI (SAS), PCIe, etc.

In one embodiment, the connection cable 250 may include a bridge unit (not shown in FIG. 2). For example, the connection cable 250 may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

In one embodiment, the connection cable 250 may include one or more data lines (e.g., one or more wires, pins, etc.) that allow the host system 210 to communicate data with the data storage device 220. For example, the connection cable 250 may include data lines (not shown in FIG. 2) that the host system 210 may use to read data from and/or write data to the data storage device 220. The host system 210 may communicate data to and from the data storage device using the communication interface 212 (e.g., via the communication interface 212). In another embodiment, the host system 210 may provide an input voltage to the data storage device 220 and the data storage device 220 may use the input voltage to operate one or more components of the data storage device 220 (e.g., the controller 230, the non-volatile storage components 245, a motor, etc.). The connection cable 250 may include one or more voltage lines (e.g., wires, pins, etc.) that may receive the input voltage from the host system 210 via the communication interface 212. The one or more voltage lines may provide the input voltage (received from the host system 210) to the data storage device 220 via the communication interface 240.

The host system 210 includes an application 211. In one embodiment, the application 211 may be a storage management application. The application 211 (e.g., the storage management application) may allow a user (e.g., an administrator, a user of the host system 210) to configure and/or manage the data storage device 220. For example, the application 211 may allow the user to configure power management settings, to configure password settings, to configure RAID settings/configurations, to encrypt/decrypt data, to configure keys used to encrypt/decrypt data, to configure temperature/cooling settings, etc. The application 211 may send data storage commands to the data storage device 220 in order to configure and/or manage the data storage device 220. These data storage commands may include SES commands/operations, SCSI commands/operations, and/or vendor commands/operations (e.g., commands/operations that are defined by a vendor of the data storage device 220).

The data storage device 220 may perform additional operations/commands (other than reading data and/or writing data to the data storage device 220) based on one or more data storage commands received from the application 211. For example, a user may change the RAID mode of the data storage device 220 (e.g., to change from RAID 0 to RAID 1) using the application 211. The application 211 may provide (e.g., transmit) one or more data storage commands to the data storage device 220. The controller 230 may receive the one or more data storage commands and may execute and/or perform the one or more data storage commands to change the RAID mode. For example, the controller 230 may parse and/or process the one or more data storage commands (as discussed in more detail below). The controller 230 may optionally perform one or more data transfers (e.g., read data, write data, etc.) based on the one or more data storage commands. For example, the controller 230 may write data (received from the host system 210) to a non-volatile storage component 245. In another example, the controller 230 may read data from a non-volatile storage component 245 and provide the data to the host system 210. The controller 230 may also provide one or more results of the one or more data storage commands to the application 211. For example, the controller 230 may provide a result indicating that a data storage command was successfully performed to the application 211.

The controller 230 may include a VATAPI, as discussed in more detail below in conjunction with FIG. 3. The controller 230 may identify the VATAPI as an SES device (rather than a CD-ROM type device) to the host system 210. Identifying the VATAPI as an SES device may indicate to the host system that the at least some portion/component of the data storage device 220 may support the one or more data storage commands (such as SES commands, SCSI commands, RAID commands, vendor commands, etc.). The host system 210 may allow the application 211 to send the data storage commands because the host system 210 may know that at least some portion/component of the data storage device 220 is capable of supporting the data storage commands. For example, the host system 210 may allow the application 211 to change the RAID mode of the data storage device 220 using one or more SES commands.

Figure 3:
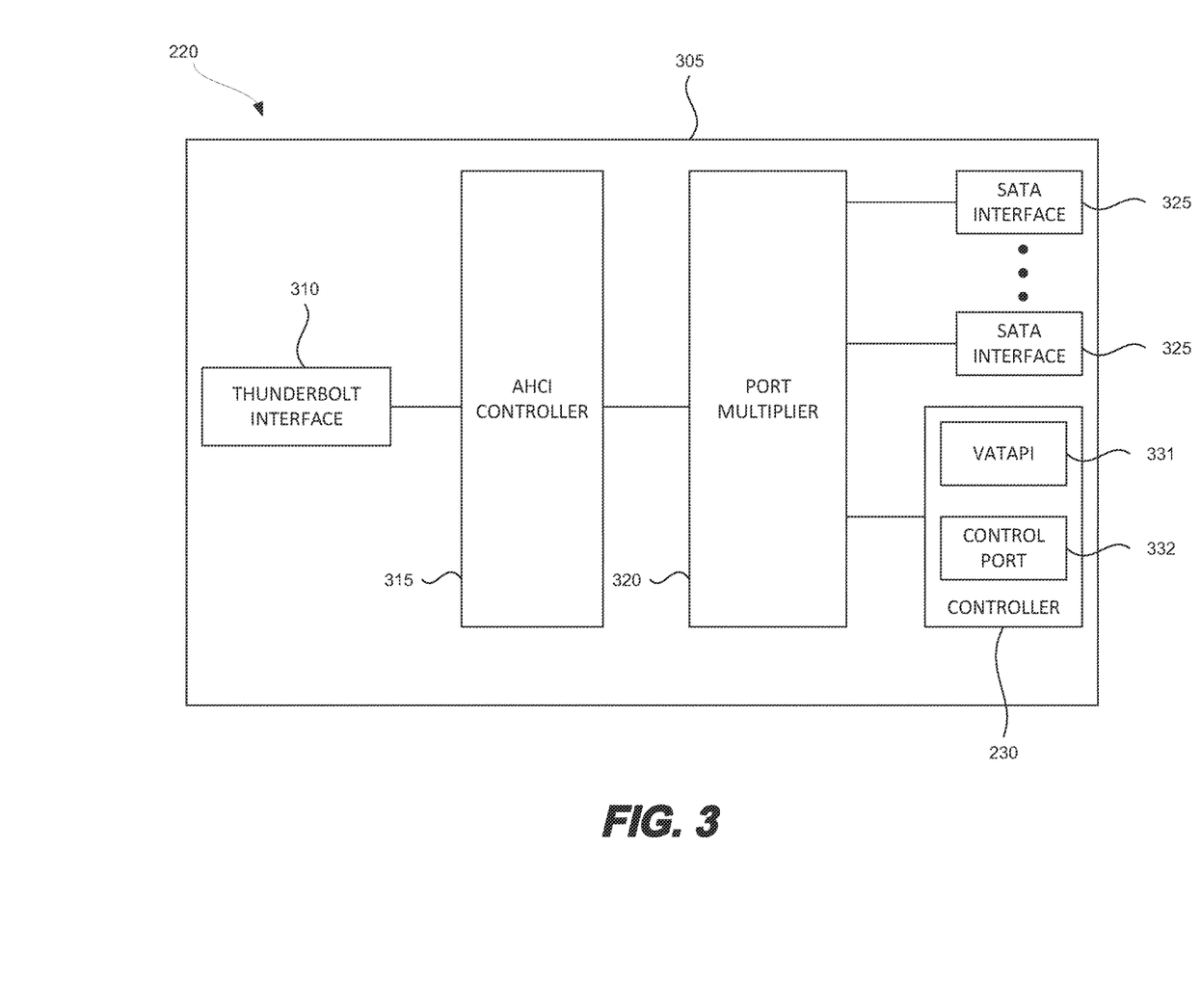
FIG. 3 is a diagram of a data storage device, according to an embodiment.

FIG. 3 is a diagram of a data storage device 220 according to an embodiment. The data storage device 220 includes a printed circuit board assembly (PCBA) 305. A Thunderbolt interface 310 (e.g., a communication interface), an advanced host controller interface (AHCI) controller 315, a port multiplier 320, SATA interfaces 325, and a controller 230 are located on the PCBA 305. The Thunderbolt interface 310 may be coupled to a computing device (such as host system 210 illustrated in FIG. 2) via a connection cable (such as connection cable 250 illustrated in FIG. 2). Although a Thunderbolt interface 310 is illustrated in FIG. 3, other types of communication interfaces (e.g., eSATA interfaces) may be used in other embodiments.

The Thunderbolt interface 310 is coupled to the AHCI controller 315. In one embodiment, the Thunderbolt interface 310 is coupled to the AHCI controller 315 via a Peripheral Component Interconnect Express (PCIe) bus. The AHCI controller 315 may allow the data storage device 220 to communicate with one or more ATA and/or SATA devices. For example, the AHCI controller 315 may allow the data storage device 220 to communicate with a SATA hard disk.

The AHCI controller 315 is coupled to a port multiplier 320 and the port multiplier 320 is coupled to SATA interfaces 325. In one embodiment, the port multiplier 320 may be a device that allows multiple ATA and/or SATA devices to be connected to a single ATA and/or SATA port/interface. For example, the port multiplier 320 may allow three SATA hard disks to communicate with the AHCI controller 315. Each of the three SATA hard disks may be coupled to the port multiplier 320 via a respective SATA interface 325. The port multiplier 320 may also include software, hardware, firmware, or a combination thereof, that provides RAID functionality. For example, the port multiplier 320 may include a device/component that allows SATA hard disks to be configured for different RAID modes.

The port multiplier 320 is coupled to the controller 230. In one embodiment, the controller 230 may receive one or more data storage commands to access data stored in a non-volatile memory of the data storage device 220 (e.g., commands to read, write, and/or update data, etc.). The controller 230 may read and/or write data stored in a non-volatile memory (e.g., in a hard disk or a flash memory coupled to the SATA interface 325) based on the data storage commands. The controller 230 includes a control port 332. The control port 332 may allow the controller 230 to access and/or communicate with the SATA devices coupled to the port multiplier 320. The control port 332 may also allow the host system (e.g., an application on the host system) to access and/or communicate with the SATA devices coupled to the port multiplier 320.

As illustrated in FIG. 3, the controller 230 also includes a VATAPI 331. The VATAPI 331 may be processing logic such as hardware (e.g., circuits, gates, an FPGA, etc.), software (e.g., executable code), firmware, or a combination thereof. In one embodiment, the controller 230 may identify the VATAPI as an SES device (rather than a CD-ROM type device) to the host system 210. For example, the controller 230 may identify (e.g., report) the VATAPI using the hexadecimal value 0x0D (which identifies the VATAPI 331 as an SES device) instead of using the hexadecimal value 0x05 (which identifies the VATAPI 331 as a CD-ROM type device). As discussed above, identifying the VATAPI 331 as an SES device may indicate to a host system (coupled to the data storage device 220) that the VATAPI 331 and/or the data storage device 220 may support the one or more data storage commands (such as SES commands, SCSI commands, vendor, commands, etc.) to perform functions other than read and/or writing data. For example, identifying the VATAPI 331 as an SES device may indicate to the host system that the VATAPI 331 and/or the data storage device 220 may support SCSI commands to change the RAID mode of the data storage device.

As illustrated in FIG. 3, the VATAPI 331 resides (e.g., is located within) the controller 230. For example, the VATAPI 331 may be circuit that is part of the controller 230. In another example, the VATAPI 331 may be executable code that resides within a memory (e.g., instruction registers) of the controller 230. In one embodiment, the VATAPI 331 may not be associated with and/or may not advertise physical hardware. For example, the controller 230 may identify the VATAPI 331 as an SES device. However, the VATAPI 331 may not be associated with an SES device. In one embodiment, the VATAPI 331 may be a destination for data storage commands received from the host system (e.g., received from an application on the host system). For example, the data storage commands transmitted by an application on the host system may be addressed to the VATAPI 331. The controller 230 may receive the data storage commands and may provide them to the VATAPI 331.

In one embodiment, the controller 230 may receive one or more data storage commands from the Thunderbolt interface 310 (e.g., a communication interface). For example, the controller 230 may receive one or more data storage commands from a storage management application on a host system (e.g., a computing device) coupled to the data storage device 220 via a connection cable. The controller 230 may provide the one or more data storage commands to the VATAPI 331. The one or more data storage commands may be SES commands, SCSI commands, RAID commands, and/or vendor commands. In one embodiment, the VATAPI 331 may parse the one or more commands. For example, the extract the one or more commands from one or more frame information structure (FIS) packets (as discussed in more detail below). The VATAPI 331 may also validate the one or more commands. For example, the VATAPI 331 may determine whether the one or more commands are in a correct format, specify correct parameters, etc.

In one embodiment, the VATAPI 331 may also process the one or more commands. For example, the VATAPI 331 may provide the one or more commands to one or more command handlers (as discussed in more detail below). A command handler may be a module or component that is configured to process a specific set of commands (e.g., a type of command, a list of commands, etc.). The one or more command handlers may execute the one or more commands and/or may provide the one or more commands to other components, modules, etc., of the data storage device 220 to execute the one or more commands. The VATAPI 331 may provide one or more results of the one or more data storage commands to the controller 230 (e.g., the controller 230 may receive the one or more results from the ATAPI 331). The controller 230 may provide the one or more results to the host system (e.g., to a storage management application of the host system) via the Thunderbolt interface 310.

Figure 4:
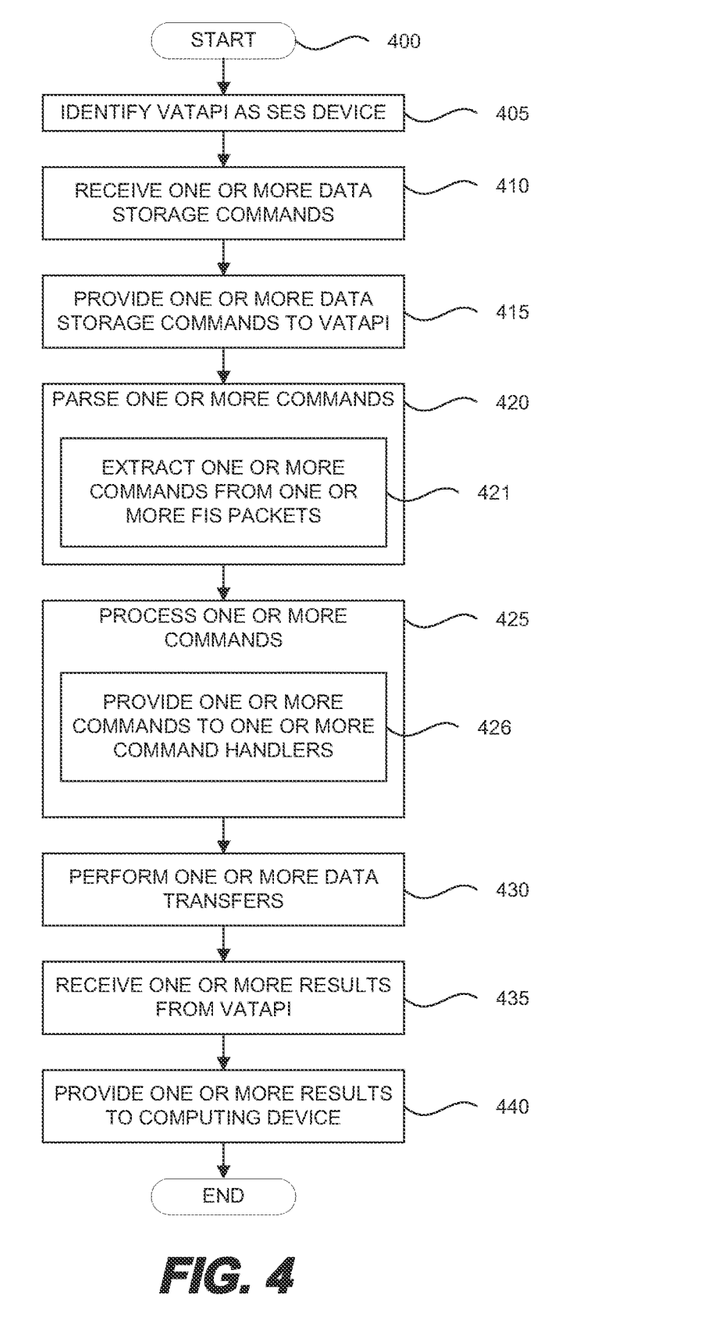
FIG. 4 is a flow diagram illustrating a process for processing one or more data storage commands, according to an embodiment.

FIG. 4 is a flow diagram illustrating a process 400 for processing one or more data storage commands, according to an embodiment. The process 400 may be performed by a controller and/or a VATAPI, as illustrated and discussed above in conjunction with FIGS. 2 and 3. In one embodiment, the VATAPI may reside in and/or be a part of the controller, as illustrated and discussed above in conjunction with FIG. 3. The controller and the VATAPI may each be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 identifies a VATAPI as an SES device. For example, the process 400 may identify the VATAPI using the hexadecimal value 0x0D (which identifies the VATAPI 331 as an SES device). At block 410, the process 400 may receive one or more data storage commands. For example, the process 400 may receive one or more SES commands, SCSI commands, RAID commands, and/or vendor commands via a communication interface (e.g., via a Thunderbolt interface). At block 415, the process 400 may provide the one or more data storage commands to the VATAPI. The process 400 may parse the one or more the one or more commands at block 420. For example, the process 400 may extract the one or more commands from one or more FIS packets at block 421. In other embodiments, the process 400 may extract the one or more commands from other types of messages/packets that may contain or include the one or more commands. The process 400 may also validate the one or more commands. For example, the process 400 may determine whether the syntax, parameters, and/or values for the one or more commands are correct/valid.

At block 425, the process 400 may process the one or more commands. For example, the process 400 may provide the one or more commands to one or more command handlers (e.g., a SCSI command handler). In one embodiment, the one or more command handlers may provide the one or more commands to another component of the data storage device. The other component of the data storage device may execute (e.g., perform) the one or more commands and may provide one or more results to the VATAPI. In another embodiment, the one or more command handlers may execute (e.g., perform) the one or more commands. At block 430, the process 400 may optionally perform one or more data transfers based on the one or more commands. For example, the one or more commands may include a command to read and/or write data to a non-volatile memory (e.g., a non-volatile component such as a hard disk or flash memory). The process 400 may write data to and/or read data from the non-volatile memory based on the one or more commands. At block 435, the process 400 may receive one or more results of the one or more data storage commands from the VATAPI. The one or more results may indicate whether the one or more commands were executed/performed successfully. The one or more results may also include additional information such as a reason why a command was not executed or performed successfully. The process 400 may provide the one or more results to a computing device (e.g., a host system) at block 440. For example, the process 400 may provide one or more results to a storage management application of the computing device.

Figure 5:
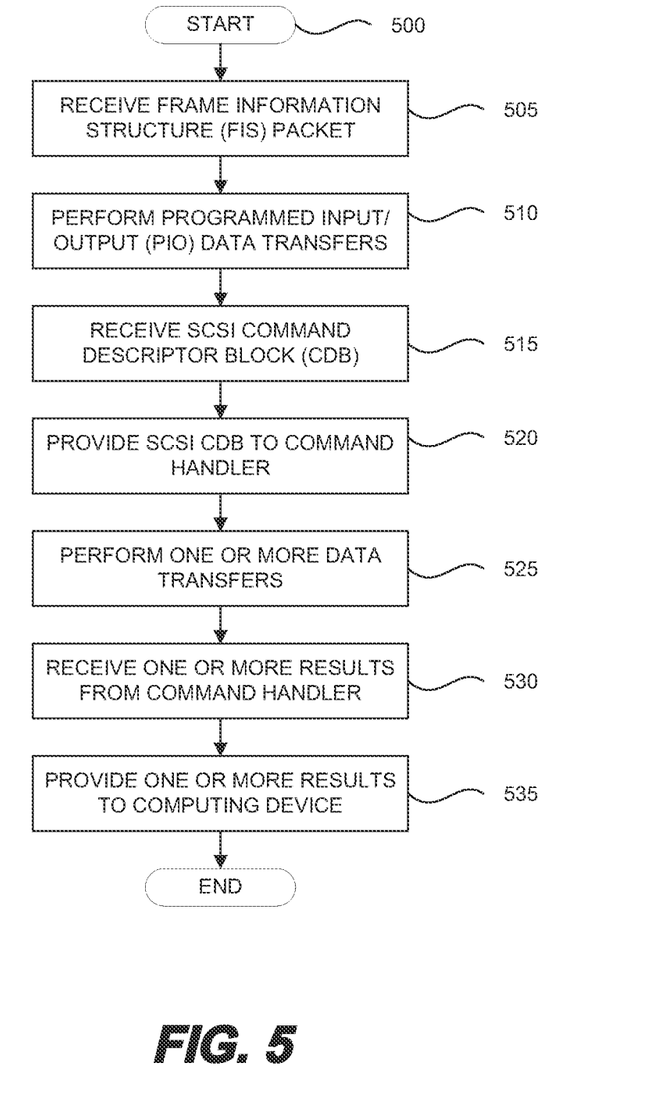
FIG. 5 is a flow diagram illustrating a process for processing one or more data storage commands, according to an embodiment.

FIG. 5 is a flow diagram illustrating a process 500 for processing one or more data storage commands, according to an embodiment. The process 500 may be performed by a controller and/or a VATAPI, as illustrated and discussed above in conjunction with FIGS. 2 and 3. In one embodiment, the VATAPI may reside in and/or be a part of the controller, as illustrated and discussed above in conjunction with FIG. 3. The controller and the VATAPI may each be processing logic that includes hardware (e.g., circuitry, dedicated logic, programmable logic, microcode, etc.), software (e.g., instructions run on a processor to perform hardware simulation), firmware, or a combination thereof.

At block 505, the process 500 receives a FIS packet that may include one or more initial data storage commands (e.g., may include a SCSI command). The process 500 may extract the one or more data storage commands from the FIS packet. At block 510, the process 500 may perform one or more programmed input/output (PIO) data transfers between the data storage device and a computing device (e.g., a host system as illustrated in FIG. 2). The PIO data transfers may be messages, packets, etc., that may be used to transfer data storage commands, data, and/or results between the data storage device and the computing device. At block 515 the process 500 may receive a SCSI command descriptor block (CDB) in the one or more PIO data transfers. For example, the process 500 may receive a FIS packet that includes the SCSI CDB. The SCSI CDB may be an example of a data storage command. At block 520, the process 500 may identify a command handler (from a plurality of command handlers) based on the SCSI CDB. For example, the process 500 may identify which command handler should be provided the SCSI CDB and may provide the SCSI COB to identified command handler. At block 525, the process 500 may perform one or more data transfers based on the SCSI COB. For example, the process 500 may execute/perform the SCSI CDB and the SCSI COB may be data storage command that writes data to a non-volatile memory. The process 500 may write data (e.g., transfer data) to the non-volatile memory based on the SCSI CDB.

At block 530, the process 500 may receive one or more results from the command handler. For example, the command handler may execute/perform the SCSI COB and may provide one or more results to the process 500. In another example, the command handler may provide the SCSI COB to another component of the data storage device. The other component of the data storage device may execute/perform the SCSI CDB and may provide one or more results to the command handler. The command handler may provide the one or more results (received from the other component) to the process 500. At block 535, the one or more results may be provided to a computing device (e.g., to a storage management application of the computing device). In one embodiment, the process 500 may also perform additional PIO data transfers between the computing device and the data storage device to provide the one or more results to the computing device.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth." etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A method comprising:
    identifying a virtual ATA packet interface (VATAPI) as a SCSI enclosure services (SES) device to a computing device that is coupled to a data storage device;
    receiving one or more data storage commands from a communication interface of the data storage device;
    providing the one or more data storage commands to the VATAPI; and
    receiving one or more results of the one or more data storage commands from the VATAPI.

2. The method of claim 1, further comprising:
parsing the one or more data storage commands; and
processing the one or more data storage commands.

3. The method of claim 2, wherein parsing the one or more data storage commands comprises:
extracting the one or more data storage commands from one or more frame information structure (FIS) packets.

4. The method of claim 2, wherein processing the one or more data storage commands comprises:
providing the one or more data storage commands to one or more command handlers.

5. The method of claim 1, further comprising:
performing one or more data transfers based on the one or more data storage commands.

6. A data storage device, comprising:
a non-volatile memory; and
a controller coupled to the non-volatile memory, the controller configured to:
identify a virtual ATA packet interface (VATAPI) as a SCSI enclosure services (SES) device to a computing device that is coupled to the data storage device;
receive one or more data storage commands from a communication interface of the data storage device;
provide the one or more data storage commands to the VATAPI; and
receive one or more results of the one or more data storage commands from the VATAPI.

7. The data storage device of claim 6, wherein the VATAPI is not associated with a physical device.

8. The data storage device of claim 6, wherein the one or more data storage commands comprise one or more SES commands.

9. The data storage device of claim 6, wherein the one or more data storage commands comprise one or more redundant array of inexpensive disks (RAID) commands.

10. The data storage device of claim 6, wherein the one or more data storage commands comprise one or more vendor commands.

11. The data storage device of claim 6, wherein the VATAPI comprises a destination for the one or more data storage commands.

12. The data storage device of claim 6, wherein the one or more data storage commands are received from a storage management application on the computing device.

13. The data storage device of claim 12, wherein the controller is further configured to:
provide the one or more results to the storage management application via the communication interface.

14. The data storage device of claim 6, wherein the controller is further configured to:
perform one or more data transfers based on the one or more data storage commands.

15. The data storage device of claim 6, wherein the communication interface comprises a Thunderbolt interface.

16. The data storage device of claim 6, wherein the controller comprises the VATAPI.

17. The data storage device of claim 6, wherein the VATAPI is configured to:
parse the one or more data storage commands; and
process the one or more data storage commands.

18. The data storage device of claim 17, wherein the VATAPI is configured to parse the one or more data storage commands by:
extracting the one or more data storage commands from one or more frame information structure (FIS) packets.

19. The data storage device of claim 17, wherein the VATAPI is configured to process the one or more data storage commands by:
providing the one or more data storage commands to one or more command handlers.

20. A data storage device, comprising:
a means for storing data; and
processing means coupled to the means for storing data, the processing means comprising:
means for identifying a virtual ATA packet interface (VATAPI) as a SCSI enclosure services (SES) device to a computing device that is coupled to the data storage device;
means for receiving one or more data storage commands from a communication interface of the data storage device;
means for providing the one or more data storage commands to the VATAPI; and
means for receiving one or more results of the one or more data storage commands from the VATAPI.

* * * * *